United States Patent Office

Re. 27,095
Reissued Mar. 23, 1971

27,095

AMMONIUM NITRATE SLURRY BLASTING COMPOSITION CONTAINING SULFUR-SODIUM NITRATE SENSITIZER

Robert B. Clay, Bountiful, and Lex L. Udy, Salt Lake City, Utah, assignors to Intermountain Research and Engineering Company, Inc.

No Drawing. Original No. 3,249,477, dated May 3, 1966, Ser. No. 364,289, May 1, 1964. Application for reissue Jan. 14, 1970, Ser. No. 7,559
Int. Cl. C06b *15/00*
U.S. Cl. 149—41 13 Claims Matter enclosed in heavy brackets [ ] appears in the original patent but forms no part of this reissue specification; matter printed in italics indicates the additions made by reissue.

*ABSTRACT OF THE DISCLOSURE*

*This invention is an improved blasting agent composition of ammonium nitrate in a predominantly aqueous slurry with a sensitizer which is a combination of elemental sulfur and sodium nitrate. This sensitizer is free of self explosive ingredients providing greater safety in handling and processing of the explosive composition.*

The present invention relates to an improved blasting agent composition. It has particular application to low cost explosives which are water plasticized or liquefied, i.e., those containing substantial properties of ammonium nitrate combined with suitable fuels and with enough liquid (usually water) to form a fluid slurry or a plastic and at least somewhat flowable mass that can be poured into boreholes, etc. The invention also contemplates use of other appropriate additive materials, including sensitizers, fuels, etc. which preferably are normally nonexplosive by themselves.

In recent years increasing quantities of explosives that are plastic, or liquid in nature, have gone into use for mining and blasting operations. They offer considerable cost savings, as compared with many other blasting agents. Most of these have involved use of substantial quantities of inorganic nitrates, preferably ammonium nitrate or ammonium nitrate with sodium nitrate, modified, e.g. by adding a suitable fuel or other material. The inorganic nitrate, which is usually the largest component, generally is not sufficiently sensitive per se for mining and blasting operation. Moreover, it is primarily an oxidizer and requires addition of fuel or a reducer for good chemical balance. Various compositions have been made up to improve the performance of the basic inorganic nitrate ingredient. In some cases, it has previously been suggested, sodium nitrate may be used to replace part of the ammonium nitrate. Various other additives, including nitrated organic materials such as cellulose nitrate (smokeless powder) trinitrotoluene (TNT), nitromethane and the like, reducing metals such as powdered aluminum, and fuels such as sulfur, carbonaceous materials, hydrocarbons, etc., have been added. In some respects the most effective and satisfactory sensitizers have been the explosive or nitrated organic additives such as TNT, picric acid, nitro-starch, smokeless powder and the like. These materials contribute energy as well as improving the sensitivity of ammonium nitrate. However, these explosive materials always involve certain hazards in handling and processing.

Some of the materials named above as sensitizers are commonly employed in finely divided form and they often tend to accumulate in pockets, hidden recesses and the like, for example in processing equipment, thus creating potentially dangerous sites and situations. An important object of the present invention is to create a blasting agent, particularly a slurry blasting agent, of suitable sensitivity and adequate energy which does not require the use of the explosive sensitizers named above. The primary object of this aspect of the invention is, of course, to achieve greater safety. This is accomplished while still using the major components mentioned above, including specifically ammonium nitrate and sodium nitrate.

For large scale blasting operations, e.g. for blasting iron ore in quantity, the blasting agent must be sensitive enough for thorough detonation at the borehole temperature, in columns of conventional diameter (usually around 6 to 9 inches, although smaller and larger diameter bores are used) and in lengths several times their diameter. Borehole temperatures may vary from about 0° C. to 30° C., depending upon geographical location, primarily. At the same time, the blasting agent should not be so sensitive as to involve any substantial risk of explosion during normal shipping, handling, or while putting it in the borehole for use. These various operations are now being carried out more and more by mechanical means, e.g., by slurry mixing and pumping machinery or by mixing and packaging equipment. Obviously, the slurry composition must not be sensitive enough to explode in small masses when subjected to moderate friction or shock of the character inherent in operation of such machinery. As a general working rule, the slurry, when finished and ready for detonation, should have a sensitivity suitable for its self-propagation of explosion in a continuous column, e.g. six diameters in length or more and not more than 9 or 10 inches in diameter, unconfined, at the borehole temperature. For far northern areas, or shallow operations in winter time, the explosive must be detonable at temperatures as low as 5° C. In other cases, the explosive need be detonable *only* at temperatures as high as 35° C. Sensitivity must not be too great, however, and a critical diameter of about 1½ to 2 inches is usually the lower working limit, at working temperatures. A 6-inch diameter column gives good general test results.

A specific object of the present invention is to prepare a slurry type blasting agent, based primarily on ammonium nitrate, but also containing sodium nitrate, which will meet the above sensitivity tests both minimum and maximum and still not necessarily contain any of the more hazardous sensitizers such as the nitrated organic materials which are normally explosive per se.

An important aspect of this invention is the discovery that by using well chosen proportions of sulfur, along with sodium nitrate, the sensitivity of high ammonium nitrate explosives, particularly those containing water, may be controlled very satisfactorily. By high ammonium nitrate it is intended to mean those compositions which contain 40% by weight or more, preferably at least 50%, of ammonium nitrate. The sulfur is preferably related to the sodium nitrate, in proportion, preferably being between 10 and 30% of the weight of sodium nitrate, proportions of about 1 to 5 being especially preferred.

In order to give flexibility for use under various conditions, it is often desirable to be able to control or to vary the sensitivity of the composition over reasonably wide ranges by adding varying but generally relatively small amounts of one or more potent sensitizer which is not explosive per se. It is also desirable that such a sensitizer have also the further property of adding energy to the composition, preferably as a fuel or reducing agent since oxidizer is commonly in excess in high ammonium nitrate explosive. It is of course desirable that all the ingredients contribute energy to the explosion, as far as it is possible to find economical ingredients having the reired properties. However, other properties such as idity, sensitivity, compatibility with each other, etc. are so important. Aluminum powder of appropriate parcle size and surface characteristics is very suitable in mpositions of this type as an aid in controlling sensivity. By adding a small amount of such material, the mperature at which the explosive will meet the required nsitivity tests named above, e.g., the 6-inch unconfined olumn self-propagating test, etc., may be substantially reuced. Finely divided aluminum also adds appreciably the explosive energy. Thus the invention contemplates se of aluminum as a supplemental sensitizer and enerizer.

Since both ammonium nitrate and sodium nitrate are xidizers, these compositions often need a fuel or reducing gent for bringing the composition into better chemical alance. It is often desirable, therefore, to add fuels in ddition to or in lieu of such aluminum, *e.g. carbohydrates uch* as starch, *or sugar, or carbonaceous fuels such as oal, asphalt, charcoal,* gilsonite. These are additional to he sulfur. It is often desirable in liquid or slurry composiions, to use liquids which assist in the slurrying or liquefyng of the composition and also contribute fuel energy. To ncrease the energy of blasting compositions containing oth sodium nitrate and sulfur, by adding energy from arious fuel sources, including those just named, and without detracting from other essential properties is still another object of this invention.

It is desirable also that the explosive composition have as high a density as possible, consistent with other necessary qualities or properties. Obviously, increased density permits the use of a greater weight of blasting agent in a borehole of given dimensions. However, increasing the density of a given composition normally also tends to decrease sensitivity, particularly in slurry-type or water plasticized blasting agents. Hence a further object of this invention is to make a blasting composition of optimum or near optimum density which has also the properties of optimum or near optimum sensitivity, together with adequate power, appropriate brisance, etc.

The nature of the present invention, and of the foregoing objects, and of others which are inherent or which will appear below, will be more fully understood and appreciated after a detailed description of the principles of the invention and specific examples of its preferred forms are explained.

A preferred general composition, according to the present invention, comprises a thick aqueous slurry containing a larger proportion of ammonium nitrate in solution and including at least a small amount of sodium nitrate. From about 40 to 70% by weight of ammonium nitrate is used. The preferred range of ammonium nitrate is about 50 to 60%. Water content, or rather liquid content, since some of the water may be replaced with a compatible liquid fuel such as ethylene glycol, glycerine, or other lower aliphatic alcohols, should be between about 10 and 20% by weight of the total composition. Preferably the liquid is usually between 12 and 16%.

Proportions totaling from about 5 to 25% by weight of sodium nitrate are preferably included in addition to the ammonium nitrate. It is desirable that at least a part of the sodium nitrate ingredient be dissolved in the liquid. The addition of sodium nitrate makes it possible to increase the total inorganic nitrate salt content of a saturated solution at a given temperature. It also makes it possible, when sulfur is included too, to sensitize the inorganic nitrates directly. Apparently, the presence of sulfur makes it possible to convert the sodium nitrate to sodium sulfate. This releases more energy than does the reaction which results when sulfur is not present. In providing an easier route for the chemical breakdown of the sodium nitrate, the whole composition is sensitized.

The ingredients named so far, generally speaking, should be so proportioned as to give reasonable chemical balance between fuel and oxidizer material. In a simple case, using sulfur as the only fuel, with sodium nitrate as the oxidizer, the reaction between the sodium nitrate and the sulfur proceeds as follows:

$$2\ NaNO_3 + S \rightarrow Na_2SO_4 + N_2 + 10_2$$

$$\text{(Mol. wt.)}\quad 170 + 32 \rightarrow 142 + 28 + 32$$

This reaction proceeds more readily with sodium nitrate than with ammonium nitrate; hence the use of sodium nitrate is desirable.

Since solubility of ammonium nitrate as well as that of sodium nitrate, and in fact of most salts, decreases as temperature is lowered, the incorporation of the second inorganic nitrate salt into the composition lowers the crystallization point or so-called fudge point of the liquid solution for a given total salt concentration. However, additional sodium nitrate beyond that which can be dissolved may be and preferably is used. Sodium nitrate in this form not only adds to the oxidizer total content but also contributes to sensitivity of the slurry in conjunction with sulfur.

It is also desirable, according to the present invention, to add a small amount of sulfur as a sensitizer. Sulfur also has fuel value and tends to improve the oxygen balance in high inorganic nitrate compositions. Proportions preferred are between 1 and 6 percent by weight, preferably 2 to 5%.

In order to produce an explosive slurry which will thicken on standing in the borehole and in order also to reduce water loss and to resist dilution of the composition by ground water which may be present in the hole, a thickener is generally required. For this purpose a small amount of guar gum, from 0.1 to 2% by weight is preferred. However, the guar gum may be replaced in part by other thickeners if desired. Starch has less thickening capacity but is usually satisfactory for this purpose since it also has some fuel value, in addition to its thickening properties, in water solutions or slurries.

As noted above, only dry fuel materials may be added to the extent required for good oxygen balance and consistent with the slurry properties desired. Materials such as gilsonite, or other heavy and preferably solid carbon or hydrocarbon residues that can be comminuted, such as hard asphalt, bituminous coal, finely divided carbon, and charcoal may be used. Dry starch, above the quantity that can be taken up by the liquid in the slurry, also is a desirable ingredient in some cases. The total of such dry fuels may vary from about 5 to 15% of the weight of the finished composition, preferably between about 7 and 12%.

An optional but usually highly desirable ingredient is aluminum powder. It is an effective sensitizer, as noted above. Moreover, it contributes considerable energy as a fuel. Proportions of ½% to 3% or more of aluminum by weight, based on the total composition, may be used.

Other fuels, or additional quantities of those mentioned above, may be added to the extent that they do not interfere with the requisite fluidity of the slurry and provided they do not increase the density of the composition too much. The density of a slurry blasting composition, according to the present invention, should not exceed about 1.4 grams per cc.

Example 1

A composition was prepared by dissolving 54 parts by weight of ammonium nitrate in 13½ parts of water at 60° C. temperature. To this were added about 9 parts of sodium nitrate—about all that would go into solution. A further quantity of 10 parts of dry granular sodium nitrate, which did not dissolve, was added thereafter, 19 parts in all.

To the resulting slurry which was still quite fluid, there were added 4 parts by weight of flowers of sulfur, 4.5 parts of powdered gilsonite and 3 parts of starch. Then one-half part by weight of a thickener, guar gum in this case, was added, making a total of 98.5 parts by weight.

This material was found to have a critical diameter, $d_c$, for self-propagation of an explosion in an unconfined column six diameters long, of about 6 inches at 35° C. This is satisfactory for many locations but not for all. Upon addition of 2 parts of finely powdered aluminum (paint grade) the sensitivity was further increased enough that the material was self-propagating at 5° C. instead of 35° C.

Example 2

A composition similar to that of Example 1 was prepared except that 10 parts of water and 5 parts of ethylene glycol were used instead of 13½ parts of water. Results were essentially the same as in Example 1, so far as sensitivity is concerned. The compositions of both Examples 1 and 2 were apparently very nearly equal in energy to slurries of ammonium nitrate sensitized with TNT. They are appreciably less expensive.

In general, for a true slurry, the composition will contain enough liquid to make it flow freely as a quasi-liquid, for most applications. This liquid may be all water, or it may contain water compatible liquids of various types, such as alcohols, glycols and oxygen derivatives of hydrocarbons in general. Aqueous solutions of fuel materials, e.g. molasses, may be included.

By balancing the excess oxidizer content of the ammonium nitrate with other fuel components, e.g. solid fuels such as gilsonite, starch, carbon black, and the like, proportions of sodium nitrate and sulfur may be varied from 5 to 25% by weight of the former and about 1 to 8% of the latter. For better operation, excess oxygen from the principal inorganic nitrate component may be balanced as fully as desired by use of other fuel components as described above.

Other modifications may be made within the spirit of the invention and within the limits outlined above. Additional fuel ingredients beyond those named above, such as sugar, molasses and the like, may be added [. Explosive sensitizers such as TNT, nitro starch, cellulose nitrate and nitro methane may be used,] along with the sodium nitrate and sulfur if desired. Aluminum may be added in proportions of about ½ to 1% by weight. Preferably, in these compositions smaller quantities of aluminum will be used than conventionally, since aluminum is often a powerful sensitizer as well as a fuel. Generally speaking, aluminum content, particularly of particles below 10 mesh (Tyler) in size will not exceed 3%.

It will be understood that, in the claims that follow, it is intended to cover the various modifications mentioned above such other changes and variations in composition and in procedure as would suggest themselves to those skilled in the art, as far as the prior art properly permits. While slurries which are relatively liquid are usually preferred, it will be understood that other moisture-containing compositions, which may not flow freely in the sense of a true liquid, but which are plasticized and capable of self conformation to a surrounding or supporting structure or surface are also within the purview of the invention, at least in its broader aspects. The moisture need not be pure water but may comprise water and water-compatible liquids such as alcohols, glycols, glycerol and the like. This liquid may comprise broadly from 5 to 25% of the total, more generally 12 to 20%, with narrower limits for specific compositions.

What is claimed is:

1. A [moisture-containing] *slurry* explosive composition which *is free of nitrated organic explosive ingredients and which* contains from about 5 to 25 percent by weight of a [moistening] liquid, the major part of which liquid is water, 40 to 70 percent of ammonium nitrate, [and] a sensitizer comprised of *a combination of* 2 to 25 percent of sodium nitrate and 1 to 8 percent of elemental sulfur, based on the total composition *and a fuel having a tendency to balance excess oxygen of said ammonium nitrate and sodium nitrate.*

2. A composition according to claim 1 [to] which [is added] *contains* 0.5 to 3 parts of aluminum powder below about 100 mesh particle size as an additional fuel and sensitizer.

3. Composition according to claim 1 to which other fuels are added which are non-explosive per se.

4. Composition according to claim 1 which contains 0.1 to 2 percent of a slurry thickener.

5. Composition according to claim 4 wherein the thickener is guar gum.

6. Composition according to claim 1 which contains 12 to 20 percent of the liquid.

7. Composition according to claim 6 which [also] contains a carbohydrate fuel.

8. Composition according to claim 1 which [also] includes a carbohydrate fuel.

9. A slurry explosive composition which *is free of nitrated organic explosive ingredients and which* contains sufficient liquid to make it flow freely as a quasi-liquid, at least the major proportion of said liquid being water, at least 50 percent by weight of ammonium nitrate, 2 to 25 percent of sodium nitrate, *a carbonaceous fuel* and about one-fifth as much sulfur as sodium nitrate, by weight, whereby the sodium nitrate and the sulfur tend to sensitize the ammonium nitrate.

10. Composition according to claim 9 wherein at least a part of the sodium nitrate is not in solution.

11. Composition according to claim 10 wherein undissolved sodium nitrate and sulfur are intimately mixed to form an effective sensitizer.

12. Composition according to claim 10 which also contains not more than 3 percent by weight of finely divided aluminum.

13. A slurry explosive blasting composition *which is free of self-explosive ingredients* comprising a saturated solution of an inorganic nitrate selected from the group which consists of ammonium nitrate and ammonium nitrate mixed with a minor proportion of sodium nitrate, said inorganic nitrate comprising at least half the total weight of the composition, a quantity of undissolved particulate sodium nitrate, about one-fifth as much sulfur as total sodium nitrate, not more than 10% of particulate metallic aluminum, and a thickening agent in sufficient proportions to reduce penetration of said slurry by ground water.

References Cited

The following references, cited by the Examiner, are of record in the patented file of this patent or the original patent.

UNITED STATES PATENTS 3,113,059 12/1963 Ursenbach et al. ------ 149—41

BENJAMIN R. PADGETT, Primary Examiner

U.S. Cl. X.R.

149—43, 44, 46, 60, 72, 73